Patented July 3, 1928.

1,676,190

UNITED STATES PATENT OFFICE.

PEHR JOHANSON AND DUANE E. WEBSTER, OF WORCESTER, MASSACHUSETTS, ASSIGNORS TO NORTON COMPANY, OF WORCESTER, MASSACHUSETTS, A CORPORATION OF MASSACHUSETTS.

RUBBER-BONDED ABRASIVE WHEEL AND METHOD OF MAKING SAME.

No Drawing.    Application filed August 18, 1925. Serial No. 51,042.

This invention relates to abrasive articles containing rubber bonded abrasive grains, and more particularly to rubber bonded abrasive wheels.

Crystalline alumina, silicon carbide, corundum, emery or other well known abrasive materials are mixed by various means with rubber and sulphur and formed into abrasive instruments, such as, grinding wheels, shapening stones, and the like. One method of making such articles involves forming a rubber solution by dissolving rubber in an appropriate solvent, such as, gasoline or naphtha, and then incorporating sulphur and an abrasive material therein by a mechanical mixing operation. This mixture of abrasive and rubber solution is then placed in a mold appropriate for shaping the desired article, and the excess rubber solvent is driven off. The thus molded article is then appropriately vulcanized. This method of forming such articles is not entirely satisfactory because it requires expensive equipment, skillfully operated, for the recovery of the rubber solvent; and generally there is considerable loss or waste of rubber solvent. Moreover, the finished article is apt to contain objectionable pores or small cavities due to the evaporation of the rubber solvent.

Another method of producing such articles involves forming a rubber mix, or compound containing rubber and sulphur, by incorporating an appropriate amount of sulphur with crude or raw rubber as it is being worked or mixed in calender rolls. The calendering operation is then continued while relatively small portions of abrasive materials are added thereto until an appropriate amount has been incorporated in the rubber mix. Articles are then formed in any appropriate manner such, for example, as by rolling the mixture of rubber, sulphur, and abrasive materials into sheets of a suitable thickness and cutting articles therefrom of the desired shape. The articles are then appropriately vulcanized by the proper correlation of temperature, time, and pressure. In the manufacture of rubber bonded abrasive articles by this method, it has been practically imposible to control or regulate the grade or hardness of the finished article, which is particularly important in the manufacture of rubber bonded abrasive or grinding wheels.

In the manufacture of a grinding wheel having a vitrified ceramic bond, the grade of the wheel may be regulated by varying the amount of bond, the less the amount of bond the softer the grade. On the other hand, a rubber wheel cannot be given a different grade by varying the amount of rubber, since two wheels having different amounts of rubber but subjected to the same vulcanization treatment will have the same grade of hardness.

It is an object of the present invention to provide an improved rubber bonded abrasive article, such as a grinding wheel, as well as a method of making such articles whereby their grade or hardness may be regulated and controlled.

A further object is to provide rubber bonded abrasive articles of various degrees of hardness and in particular to make an abrasive wheel which is softer in its cutting properties than the ordinary wheel bonded solely by vulcanized rubber.

In accordance with the invention, we form a rubber mixture, or compound, by mixing together appropriate quantities of crude or raw rubber and sulphur in any suitable manner. A definite amount of abrasive material in the form of abrasive grains is then added to and worked into the compound together with an appropriate amount of an agent, preferably a wax, such as beeswax, adapted to modify the properties of the rubber so as to change the grade of the abrasive article. The article is then formed to the desired shape and appropriately vulcanized so that the rubber mixture forms a bond holding the abrasive grains.

By grade or hardness as used throughout this specification and the appended claims, we refer to a characteristic of the relation between the rubber bond and the abrasive grains, namely, the resistance to separation of the abrasive grains from the rubber bond. For all present purposes, a hard rubber bonded abrasive article may be defined as one in which the adhesion between the abrasive grains and the rubber bond is relatively large, while a soft article is one in which the resistance to separation of the abrasive grains from the rubber bond is relatively small. This adhesion between, or the resistance to separation of the abrasive grains from the rubber bond can be controlled and regulated to a large extent in accordance with the invention to produce an article of any desired grade or hardness.

Of the various agents found suitable for the practice of the invention, we prefer to employ certain waxes, such for example, as carnauba wax, candelitta wax, Japan wax, curriers wax, paraffin wax and, particularly, beeswax. Such materials, when used in a sufficient amount, are peculiarly adapted for decreasing the adhesion between the abrasive grains and the vulcanized rubber bond to produce an abrasive article, such as a grinding wheel, which is not as hard as those made prior to this invention.

It should be noted that in the practice of the invention we incorporate abrasive grains of desired size in the compound together with an agent of appropriate character and in an amount adapted not only to soften the unvulcanized rubber to facilitate its working but also to modify the bonding properties of the final vulcanized rubber so as to decrease the grade hardness of the rubber bonded article. Different amounts of different modifying agents are necessary to produce substantially the same modifying action. Thus, we have obtained satisfactory results employing from about ⅛ ounce to about 3 ounces of beeswax per pound of compound, whereas, it would be necessary to employ from about ½ ounces to about 12 ounces of paraffin wax to obtain an equivalent modifying action. In general, we prefer to substantially completely vulcanize the articles produced in accordance with the invention.

The invention will be illustrated further by its practice in the manufacture of the following specific type of rubber bonded grinding wheels. A compound may be prepared by mixing together 65 parts of crude or raw rubber and 35 parts of sulphur by means of mixing or calender rolls. To each pound of compound about 7 pounds of abrasive grains of any desired grit size are added together with from about ⅛ ounce to about 3 ounces of beeswax. The abrasive grains, and the beeswax in finely divided solid form, are appropriately incorporated in the compound by the periodic addition of small amounts as the compound is being calendered. A disc of appropriate size and thickness is then cut from a sheet of the mixture of rubber, sulphur, beeswax and abrasive grains and completely vulcanized. The usual grading and standardization tests indicate that this type of wheel is not as hard and the adhesion between or resistance to separation of the vulcanized rubber bond and the abrasive grains is not as great as in a wheel which did not contain beeswax, but which was otherwise of similar composition.

The invention provides an improved rubber bonded abrasive article as well as a convenient and economical method of producing articles, such as rubber bonded grinding wheels, whereby the grade or hardness may be regulated and controlled to a far greater degree than has heretofore been possible. Grinding wheels made in accordance with the invention have met the requirements for certain grinding operations in a more satisfactory manner than any grinding wheel heretofore produced. Thus, grinding wheels made in accordance with the invention are particularly useful for snagging and for certain grinding operations where an exceedingly fine finish is desired.

Having thus described our invention, what we claim as new and desire to secure by Letters Patent is:

1. The improvement in the manufacture of rubber bonded abrasive articles, such as grinding wheels, which comprises incorporating in the rubber bond a wax in an amount sufficient to modify the properties of the vulcanized rubber bond and decrease the hardness of the bonded article.

2. The improvement in the manufacture of rubber bonded abrasive articles, such as grinding wheels, which comprises incorporating in the rubber bond from about ⅛ ounce to about 3 ounces of beeswax per pound of bond.

3. An abrasive article, such as a grinding wheel, comprising abrasive grains incorporated in a vulcanized rubber bond containing a wax, said bond being materially softer than a bond of vulcanized rubber.

4. An abrasive article, such as a grinding wheel comprising abrasive grains incorporated in a vulcanized rubber bond containing from about ⅛ ounce to about 3 ounces of beeswax per pound of bond.

Signed at Worcester, Massachusetts, this 8th day of August 1925.

PEHR JOHANSON.
DUANE E. WEBSTER.